(12) United States Patent
Kinch et al.

(10) Patent No.: US 10,480,651 B2
(45) Date of Patent: Nov. 19, 2019

(54) TRANSMISSION PARK CONTROL SYSTEM

(71) Applicant: Ford Global Technologies, LLC, Dearborn, MI (US)

(72) Inventors: Derek Kinch, Ypsilanti, MI (US); Timothy Andrew Sikowski, China Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 195 days.

(21) Appl. No.: 15/662,373

(22) Filed: Jul. 28, 2017

(65) Prior Publication Data

US 2019/0032780 A1    Jan. 31, 2019

(51) Int. Cl.
*F16H 63/34*     (2006.01)
*F02N 15/02*    (2006.01)
*F16K 11/07*    (2006.01)
*F16H 63/50*    (2006.01)
*F16K 31/06*    (2006.01)

(52) U.S. Cl.
CPC ......... *F16H 63/3483* (2013.01); *F02N 15/02* (2013.01); *F16K 11/07* (2013.01); *F16K 31/0613* (2013.01); *F02N 2200/0802* (2013.01); *F16H 63/50* (2013.01)

(58) Field of Classification Search
CPC .. F16H 63/3483; F16H 61/0206; F16H 63/50; F02N 15/02; F02N 2200/0802; F16K 11/07
See application file for complete search history.

(56) References Cited

U.S. PATENT DOCUMENTS

| 8,104,511 B2* | 1/2012 | Reilly ....................... F16K 3/26 |
| | | 137/625.65 |
| 8,157,076 B2 | 4/2012 | Foster |
| 9,114,790 B2 | 8/2015 | Kinch et al. |
| 2016/0069451 A1 | 3/2016 | McDonough et al. |

* cited by examiner

*Primary Examiner* — Tinh T Dang
(74) *Attorney, Agent, or Firm* — David Kelley; Brooks Kushman P.C.

(57) ABSTRACT

A transmission includes a hydraulically actuated park valve with two spools in a common housing. One of the spools engages and disengages the park mechanism in response to manipulation of line pressure and engagement of specified shift elements. A pin selectively engages this spool to hold it in position. The valve is designed such that friction holds the spool in position in the absence of hydraulic pressure or electric power. The second spool controls an out-of-park circuit such that the park mechanism remains disengaged when desired. The two spools are separated by a compression spring.

12 Claims, 10 Drawing Sheets

TRANSMISSION PARK CONTROL SYSTEM

TECHNICAL FIELD

This disclosure relates to the field of hydraulic control systems for automatic transmissions for motor vehicles. More particularly, the disclosure relates to a system of engaging and disengaging a parking pawl.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

When a vehicle is parked, the transmission may engage a parking pawl which holds the transmission shaft stationary to prevent the vehicle from rolling. The parking system is designed to remain engaged without consuming any power during extended unattended periods. Normally, the parking pawl is engaged in response to the driver selecting Park and is disengaged in response to the driver selecting any other range, such as Reverse, Neutral, Drive, or Low. However, there are some conditions in which the transmission may over-ride the driver selection.

SUMMARY OF THE DISCLOSURE

A transmission includes first and second spools, a line pressure circuit, first and second hydraulic circuits, a compression spring, a pin, and a solenoid. The first and second spools are supported to slide within a valve housing. The first spool disengages a park mechanism in a first position and engages the park mechanism is a second position. The park mechanism may bias the first spool toward the second position. The line pressure circuit biases the first spool toward the first position. The second spool fluidly connects an out-of-park circuit the line pressure circuit in the third position and vents the out-of-park circuit in a fourth position. The first and second hydraulic circuits bias the second spool toward the third position. The compression spring separates the first spool from the second spool, biasing the first spool toward the first position and biasing the second spool toward the fourth position. The pin selectively engages the first spool to restrict motion of the first spool. The solenoid pulls the pin away from the first spool. The transmission may also include third and fourth hydraulic circuits and first and second check valves. The third and fourth hydraulic circuits engage first and second shift elements. The first and second check valves alternately fluidly connect the first and second hydraulic circuits, respectively, to either line pressure or to the third and fourth hydraulic circuits, respectively, based on pressure.

A park valve includes first and second spools, a compression spring, a pin, and a solenoid. The first and second spools are supported to slide within a valve housing. The first spool is adapted to mechanically engage and disengage a park mechanism. The compression spring separates the first spool from the second spool. The pin selectively engages the first spool to restrict motion of the first spool. The pin may slide in a direction perpendicular to a sliding direction of the first spool. The solenoid is configured to pull the pin out of engagement with the first spool. The housing may define a first port such that pressurized fluid supplied via the first port acts on a first area of the first spool biasing the first spool toward a position in which the park mechanism is engaged. The housing may further define second and third ports such that pressurized fluid supplied via the second and third ports acts on second and third areas of the second spool biasing the second spool toward a position in which the park mechanism is disengaged. A sum of the second and third areas exceed the first area. The housing may further define fourth, fifth, and sixth ports such that the park valve fluidly connects the fifth port alternately to the fourth port or to the sixth port based on a position of the second spool.

A transmission control method includes starting an engine, elevating a line pressure, and reducing the line pressure. The engine is started a spool is held in an out-of-park position by a holding device. Elevating the line pressure occurs while the spool is in the out-of-park position and forces the holding device out of engagement with the spool. Reducing the line pressure moves the spool into a park position. At least one shift element may be engaged after starting the engine and before elevating the line pressure to bias the spool toward the out-of-park position. The method may also include starting the engine while the spool is held in the park position by the holding device. While the spool is in the park position, the line pressure may be elevated to force the holding device out of engagement with the spool. Then, at least one shift element may be engaged to move the spool into the out-of-park position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
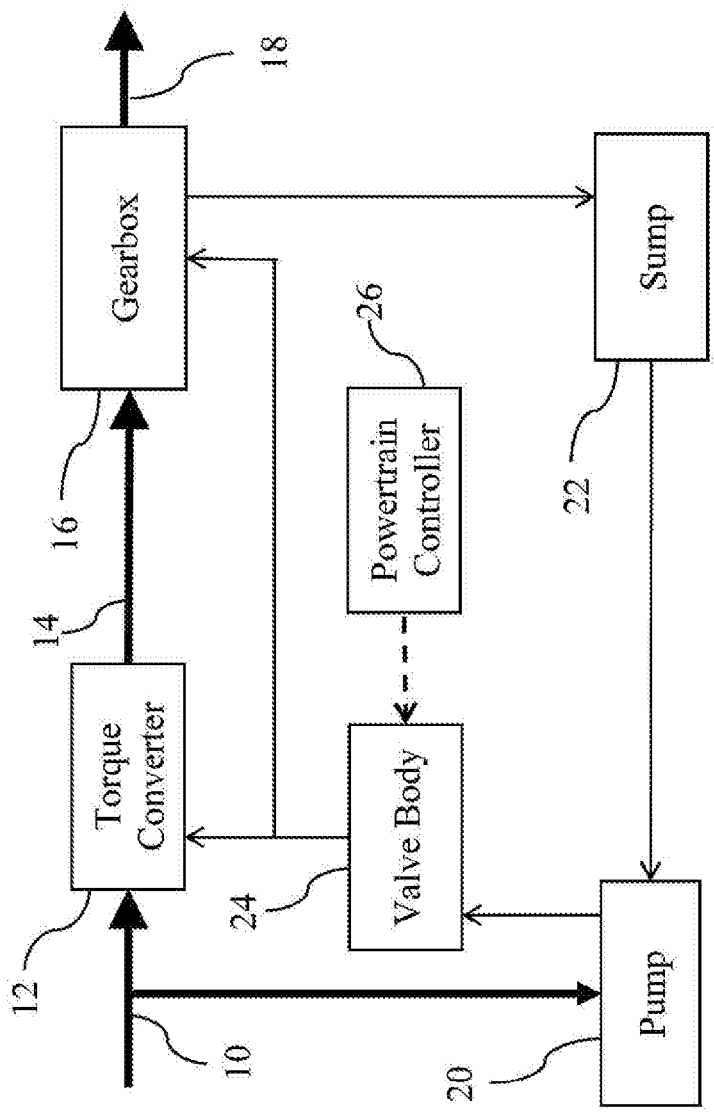
FIG. 1 is a schematic diagram of a transmission system.

FIG. 1 schematically illustrates a vehicle transmission. Bold solid lines represent mechanical power flow connections. Thin solid lines represent the flow of hydraulic fluid. Dashed lined represent the flow of information signals. Power is supplied at input shaft 10, generally from an internal combustion engine crankshaft. Fluid coupling 12 includes an impeller driveably connected to input shaft 10 and a turbine driveably connected to turbine shaft 14. Power is transmitted from the impeller to the turbine via moving fluid whenever the impeller rotates faster than the turbine. Fluid coupling 12 may be a torque converter which also includes a stator which redirects the fluid when the impeller is rotating substantially faster than the impeller such that the turbine torque is a multiple of the impeller torque. Gearbox 16 includes gearing and shift elements configured to establish various power flow paths between turbine shaft 14 and output shaft 18. Each power flow path may be established by engaging an associated subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

The shift elements within gearbox 16 are engaged by supplying hydraulic fluid at an elevated pressure to a clutch apply chamber. Each shift element may include a clutch pack having friction plates splined to one component interleaved with separator plates splined to a different component. The fluid forces a piston to squeeze the clutch pack such that frictional force between the friction plates and the separator plates couples the components. The torque capacity of each shift element varies in proportion to changes in the fluid pressure. Pump 20, driven by input shaft 10, draws fluid from sump 22 and delivers it at an elevated pressure to valve body 24. Valve body 24 delivers the fluid to the clutch apply chambers at a pressure controlled in accordance with signals from powertrain controller 26. In addition to the fluid provided to clutch apply chambers, valve body provides fluid for lubrication and provides fluid to torque converter 12. The fluid eventually drains from gearbox 18 back to sump 22 at ambient pressure.

Figure 2:
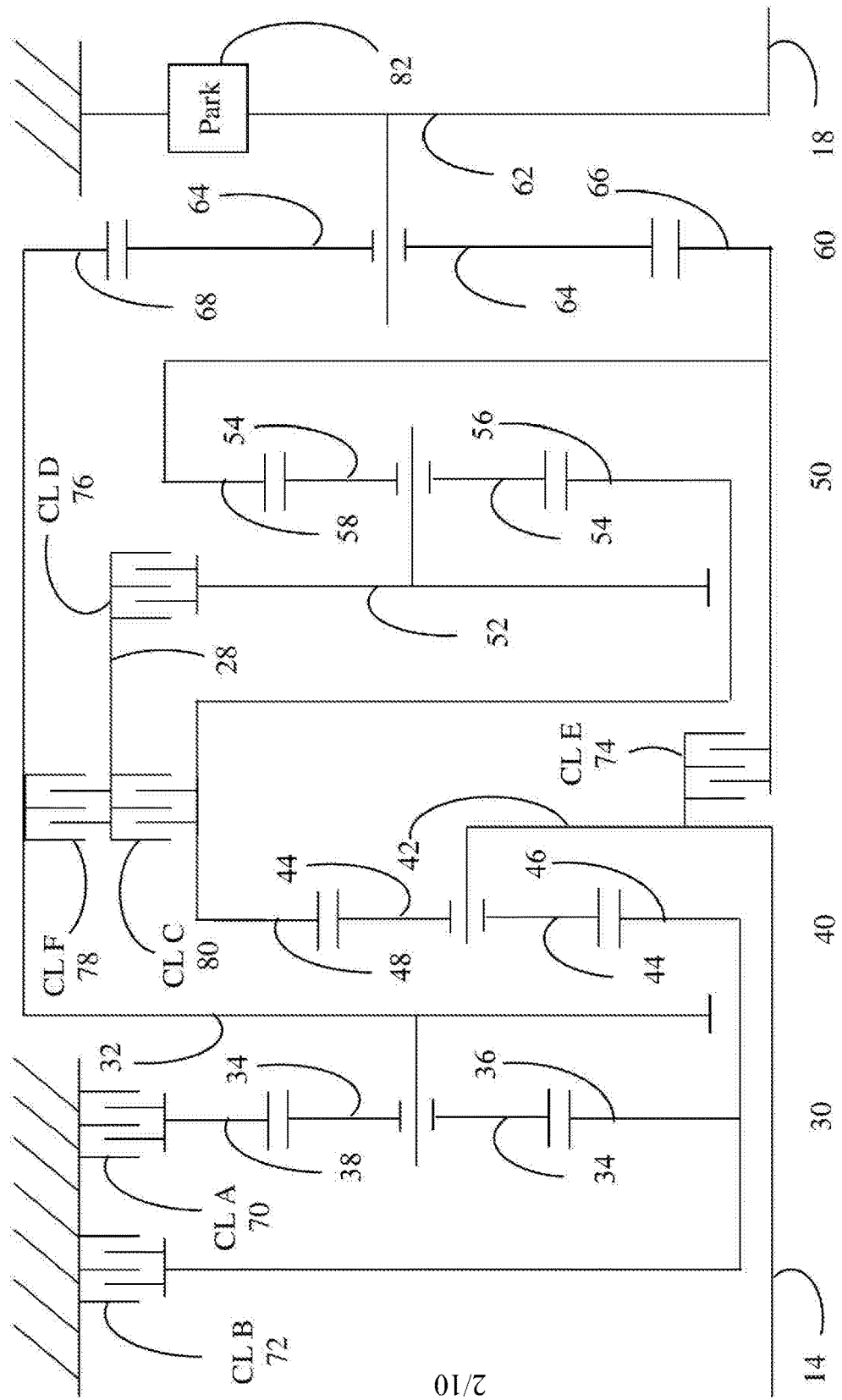
FIG. 2 is a schematic diagram of a transmission gearing arrangement suitable for the gearbox of the transmission system of FIG. 1.

An example transmission is schematically illustrated in FIG. 2. The transmission utilizes four simple planetary gear sets 30, 40, 50, and 60. Sun gear 36 is fixedly coupled to sun gear 46, carrier 32 is fixedly couple to ring gear 68, ring gear 48 is fixedly coupled to sun gear 56, ring gear 58 is fixedly coupled to sun gear 66, turbine shaft 14 is fixedly coupled to carrier 42, and output shaft 18 is fixedly coupled to carrier 62. Ring gear 38 is selectively held against rotation by brake 70 and sun gears 36 and 46 are selectively held against rotation by brake 72. Turbine shaft 14 is selectively coupled to ring gear 58 and sun gear 66 by clutch 74. Intermediate shaft 28 is selectively coupled to carrier 52 by clutch 76, selectively coupled to carrier 32 and ring gear 68 by clutch 78, and selectively coupled to ring gear 48 and sun gear 56 by clutch 80. A suggested ratio of gear teeth for each planetary gear set is listed in Table 1.

TABLE 1

| | |
|---|---|
| Ring 38/Sun 36 | 2.20 |
| Ring 48/Sun 46 | 1.75 |
| Ring 58/Sun 56 | 1.60 |
| Ring 68/Sun 66 | 3.70 |

As shown in Table 2, engaging the clutches and brakes in combinations of four establishes ten forward speed ratios and one reverse speed ratio between turbine shaft 14 and output shaft 18. An X indicates that the clutch is required to establish the speed ratio. An (X) indicates the clutch can be applied but is not required to establish the power flow path. In $1^{st}$ gear, either clutch 78 or clutch 80 can be applied instead of applying clutch 76 without changing the speed ratio. When the gear sets have tooth numbers as indicated in Table 1, the speed ratios have the values indicated in Table 2.

TABLE 2

| | A 70 | B 72 | C 80 | D 76 | E 74 | F 78 | Ratio | Step |
|---|---|---|---|---|---|---|---|---|
| Rev | X | X | | X | | X | −4.79 | 102% |
| Park | X | X | X | | | | | |
| $1^{st}$ | X | X | | (X) | X | | 4.70 | |
| $2^{nd}$ | X | X | X | X | | | 2.99 | 1.57 |
| $3^{rd}$ | X | | X | X | X | | 2.18 | 1.37 |
| $4^{th}$ | X | | X | X | | X | 1.80 | 1.21 |
| $5^{th}$ | X | | X | | X | X | 1.54 | 1.17 |
| $6^{th}$ | X | | | X | X | X | 1.29 | 1.19 |
| $7^{th}$ | | | X | X | X | X | 1.00 | 1.29 |
| $8^{th}$ | | X | | X | X | X | 0.85 | 1.17 |
| $9^{th}$ | | X | X | | X | X | 0.69 | 1.24 |
| $10^{th}$ | | X | X | X | | X | 0.64 | 1.08 |

Parking pawl 82 selectively couples output shaft 18 to the transmission case to prevent vehicle movement when the vehicle is parked. Unlike shift elements 70-80, parking pawl 82 is designed to remain engaged without any external power once engaged. As illustrated in Table 2, shift elements 70, 72, and 80 may be engaged when the transmission is in Park. This combination does not establish a power flow path between turbine shaft 14 and output shaft 18. However, having several clutches already applied decreases the number of clutch engagements required to transition into reverse or 1st gear. Other combinations of three or fewer shift elements would also provide this benefit. Furthermore, it is advantageous to have the elements of the transmission held against rotation by hydraulic clutches as the parking pawl is released. This may be accomplished by engaging five of the six shift element. Then, the power flow path associated with either reverse of first gear is established by gradually releasing a shift elements. This sequence avoids the sudden jerk that may accompany release of the parking pawl while a power flow path is engaged. For example, to transition from Park to Reverse, elements D and F may be engaged prior to or simultaneous with disengagement of the parking pawl placing the transmission in a locked state with elements A, B, C, D, and F all engaged. Then, element C is gradually released to establish the Reverse power flow path. Similarly, to transition from Park to 1st, elements D and E may be engaged prior to or simultaneous with disengagement of the parking pawl placing the transmission in a locked state with elements A, B, C, D, and E all engaged. Then, element C is gradually released to establish the 1st gear power flow path.

Figure 3:
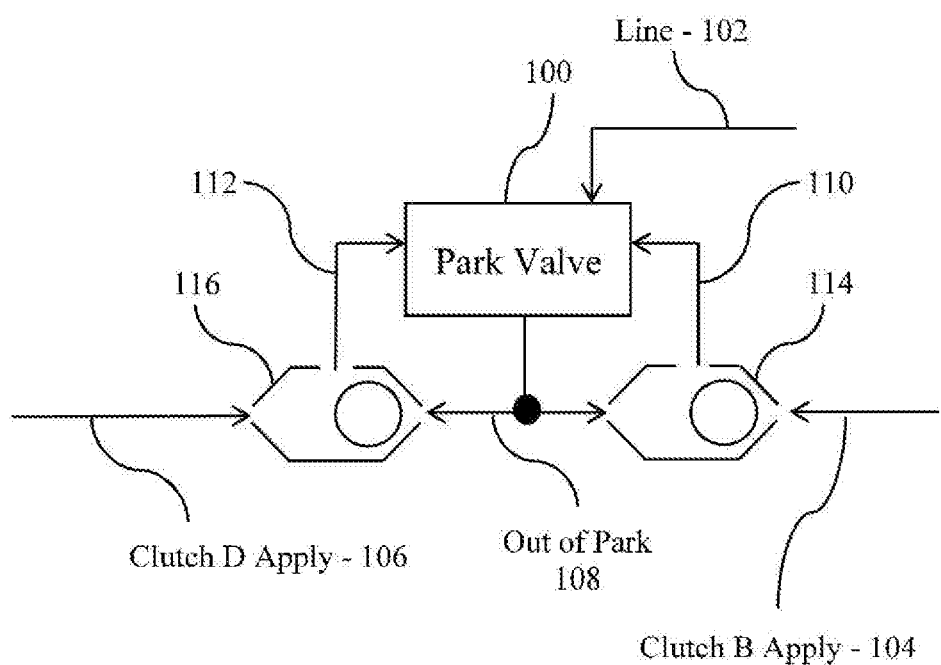
FIG. 3 is a schematic diagram of a park subsystem of a hydraulic control system for the transmission of FIG. 1.

FIG. 3 schematically illustrates the park control subsystem of a hydraulic control system. A spool of park valve 100 is mechanically linked to the park mechanism 82, such that movement in one direction engages the park mechanism and movement in the opposite direction disengages the park mechanism. A spring within the park mechanism biases the system toward engagement. The hydraulic control system includes a line pressure circuit 102 that supplies pressurized fluid to other hydraulic circuits in hydraulic control system. The pressure of fluid in the line pressure circuit 102 is controlled using a regulator valve and, in some cases, by controlling the pump displacement. Line pressure biases the park valve toward the park position. The hydraulic control system also includes a set of clutch apply circuits that are routed to apply chamber of each hydraulically controlled shift elements. The pressures of fluid in the clutch apply circuits are controlled to levels between zero and the pressure in the line pressure circuit 102. These clutch apply circuits include circuits 104 and 106 that engage shift elements B and D respectively. Park valve 100 fluidly connects an out-of-park circuit 108 to the line pressure circuit 102 when park is disengaged and vents out-of-park circuit 108 when park is engaged. Hydraulic circuits 110 and 112 bias the park valve toward the disengaged position. Check valve 114 fluidly connects circuit 110 to either clutch B apply circuit 104 or out-of-park circuit 108, whichever has the higher pressure. Similarly, check valve 116 fluidly connects circuit 112 to either clutch D apply circuit 106 or out-of-park circuit 108, whichever has the higher pressure.

When the park mechanism is engaged, both the park mechanism itself and line pressure tend to hold park valve 100 in the engaged position. To disengage the park mechanism, clutches B and D are engaged by commanding pressure equal to line pressure to apply circuits 104 and 106. Check valves 114 and 116 fluidly connect these clutch apply circuits to circuits 110 and 112 respectively. Pressure in circuits 110 and 112 force the park valve into the disengaged position. Once in the disengaged position, park valve 100 fluidly connects out-of-park circuit 108 to line pressure circuit 102. As a result, the park valve tends to stay in the disengaged position even if clutches B and D are released. To re-engage the park mechanism, the pressure in line pressure circuit 102 is reduced to a level at which the park mechanism spring forces the park valve to the engaged position.

Figure 4:
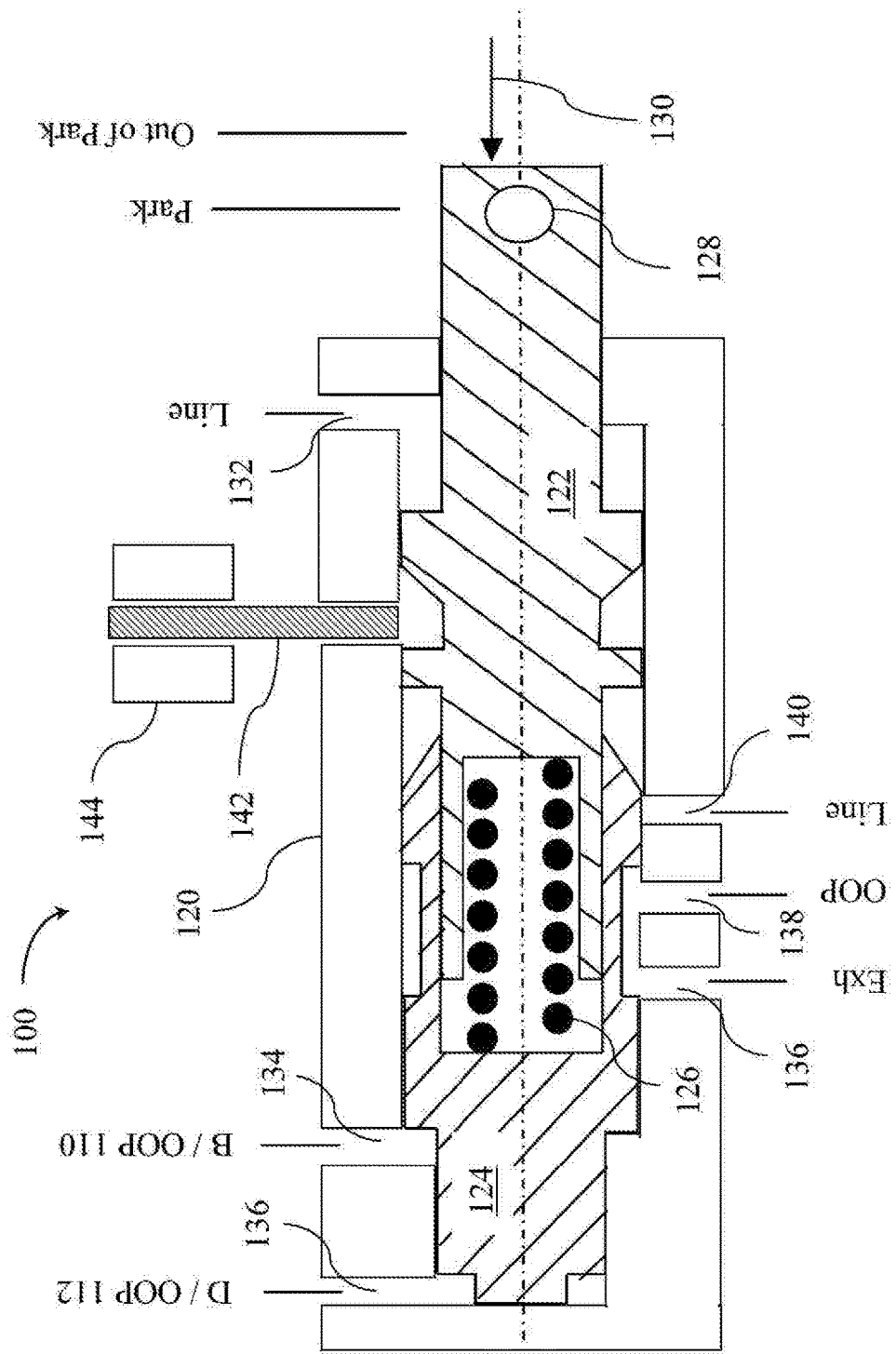
FIG. 4 illustrate a park valve assembly for the transmission of FIG. 1 in a position corresponding to park engaged with the engine running.

FIG. 4 shows a cross section of park valve 100 in the position corresponding to Park with the engine running. The valve includes a housing 120 with a bore and several ports. Two separate spools slide within the bore: lever interface spool 122 and actuation spool 124. Compression spring 126 is arranged between the two spools biasing spool 122 toward the right and biasing spool 124 toward the left. Spring 126 is shown slightly compressed in FIG. 4. Lever interface spool 122 is mechanically linked to the park mechanism via a feature such as hole 128. The park mechanism includes a spring that applies a return force 130 on spool 122 tending to push it to the left (pawl engaged position). Line pressure circuit 102 is connected to port 132 such that line pressure also biases lever interface spool 122 toward the left, tending to hold the park mechanism in the engaged position.

Circuits 110 and 112 are connected to ports 134 and 136 respectively. Fluid pressure in these circuits act on separate areas of actuation spool 124, biasing spool 124 toward the right. Ports 136, 138, and 140 are connected to exhaust, out-of-park circuit 108, and line pressure circuit 102 respectively. When actuation spool 124 is in the position shown in FIG. 4, it fluidly connects ports 136 and 138 to exhaust out-of-park circuit 108.

Holding pin 142 is shown in a retracted position in which it does not engage spool 122. Pin 142 may be biased toward this position by a spring or other force. When current is supplied to solenoid 144, it applies a magnetic force to pin 142 pushing it into engagement with spool 122.

Figure 5:
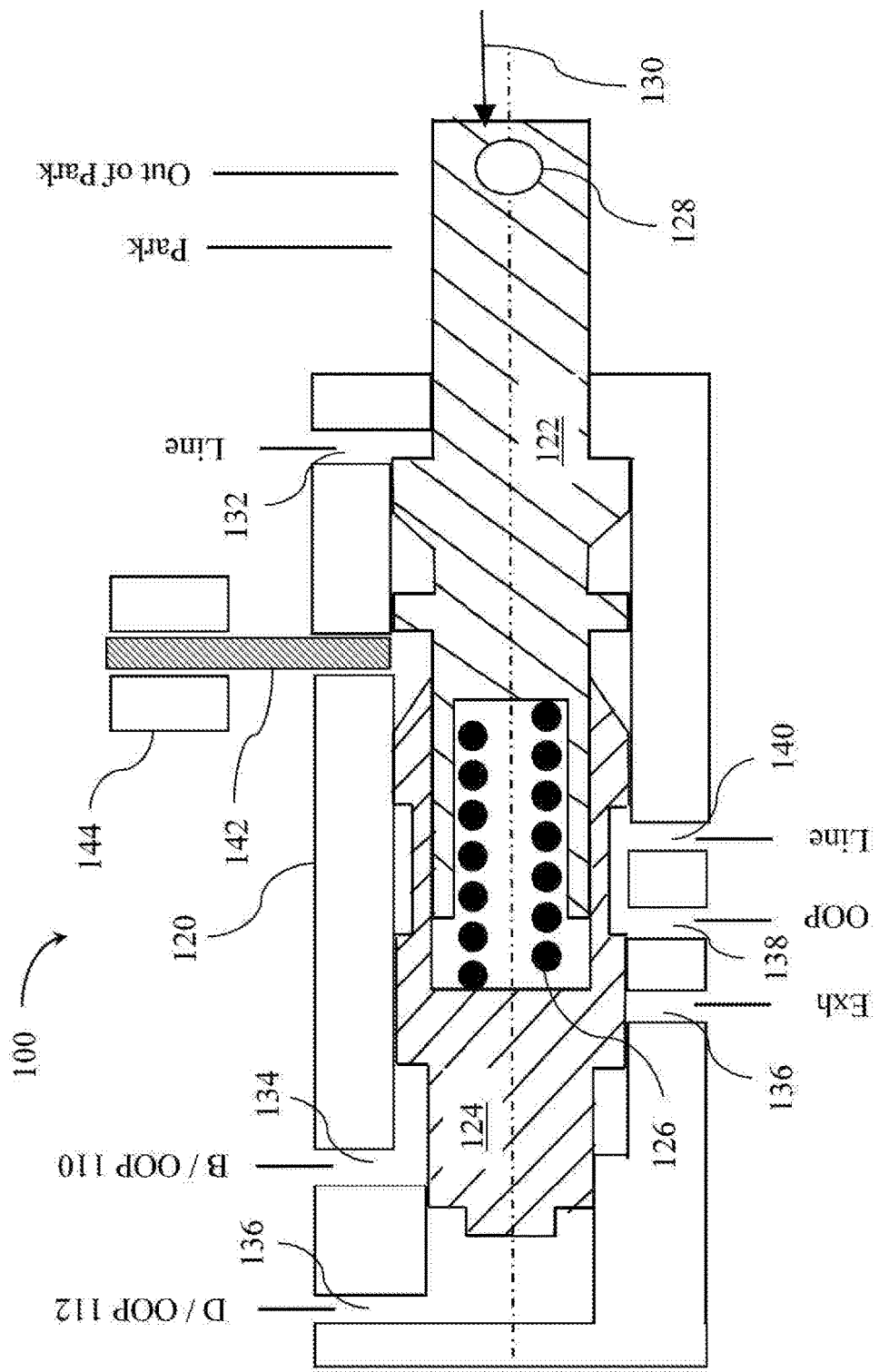
FIG. 5 illustrate a park valve assembly for the transmission of FIG. 1 in a position corresponding to park disengaged with the engine running.

FIG. 5 shows a cross section of park valve in the position corresponding to Drive, Reverse, or Neutral. The valve is moved from the position of FIG. 4 to the position of FIG. 5 by engaging shift elements B and D at line pressure. Line pressure acts on a larger area on the left side of spool 124 than on the right side of spool 122, causing a net rightward force. The force on spool 124 is transmitted to spool 122 via spring 126. When the line pressure is sufficiently high, this net force overcomes the force 130 of the park mechanism return spring, pushing both spools to the position shown in FIG. 5 and disengaging the parking pawl.

With spool 124 in this position, port 138 is fluidly connected to port 140 such that line pressure circuit 102 is fluidly connected to out-of-park circuit 108. Due to the behavior of check valves 114 and 116, line pressure will continue to be supplied to ports 110 and 112 even if shift elements B and D are later released. To return to Park, line pressure is commanded to a low value such that the net force pushing the spools to the right is less than the park mechanism return force 130. The park mechanism then re-engages the parking pawl and moves the spools to the position shown in FIG. 4.

Figure 6:
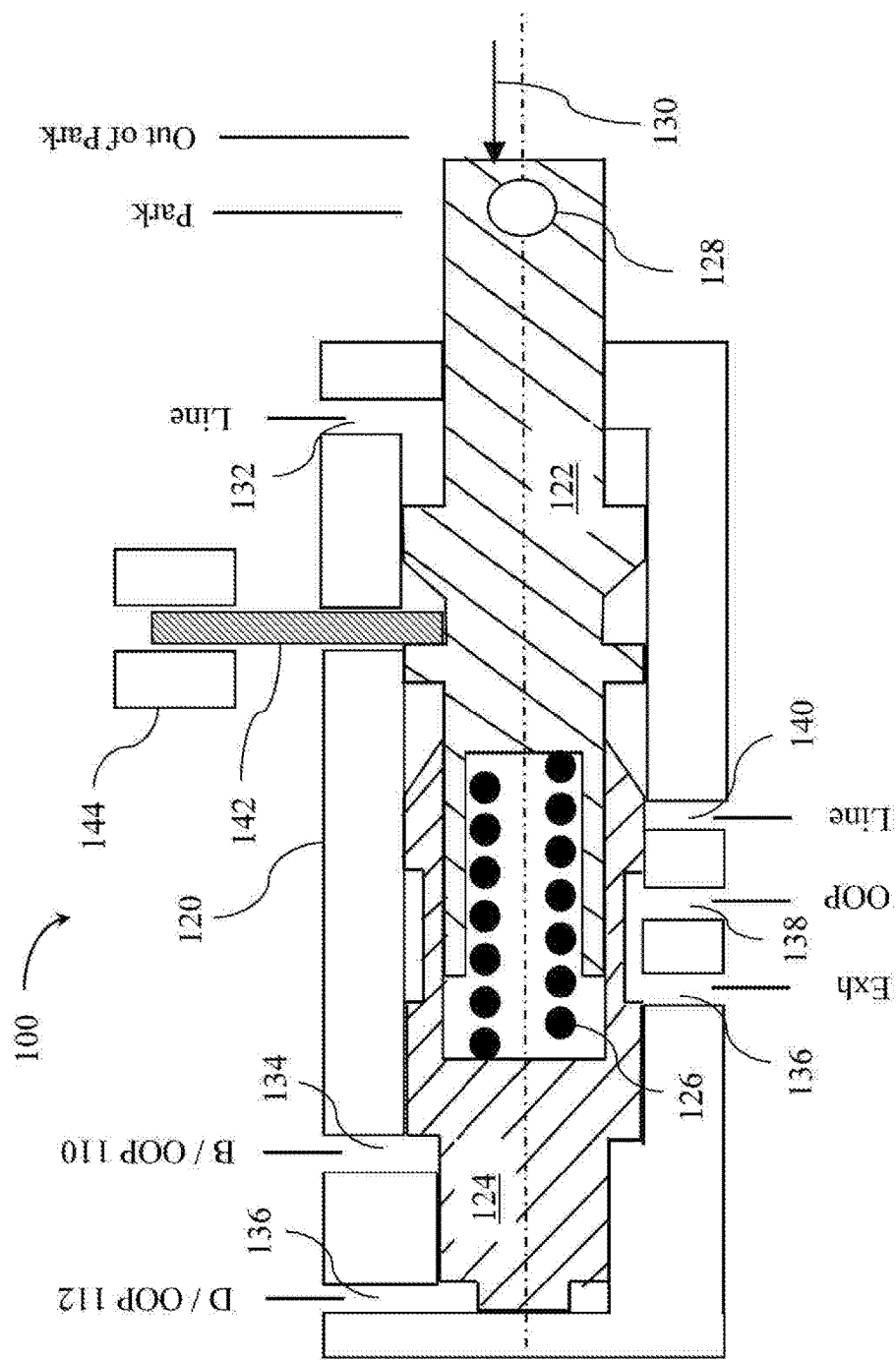
FIG. 6 illustrate a park valve assembly for the transmission of FIG. 1 in a position corresponding to park engaged with the engine off.

FIG. 6 shows the park valve 100 in the configuration corresponding to Park with the engine shut off. In this condition, the return spring in the park mechanism continues to keep the parking pawl engaged. For added security against un-commanded park release, solenoid 144 is energized prior to engine shutdown to push pin 142 into engagement with lever interface spool 122. When the engine is off, line pressure goes to zero and the lever interface valve 122 may move slightly to the right due to force from spring 126. The force from spring 126 pushes spool 122 into pin 142 such that friction between spool 122 and pin 142 holds pin 142 in position. The configuration of FIG. 6 may also be used while the engine is running or is being started to provide security against un-commanded park release due to un-commanded application of clutches B or D. In that case, the solenoid would be de-energized to transition to the configuration of FIG. 4 as part of the transition out of Park in response to driver movement of the shift selector.

Figure 7:
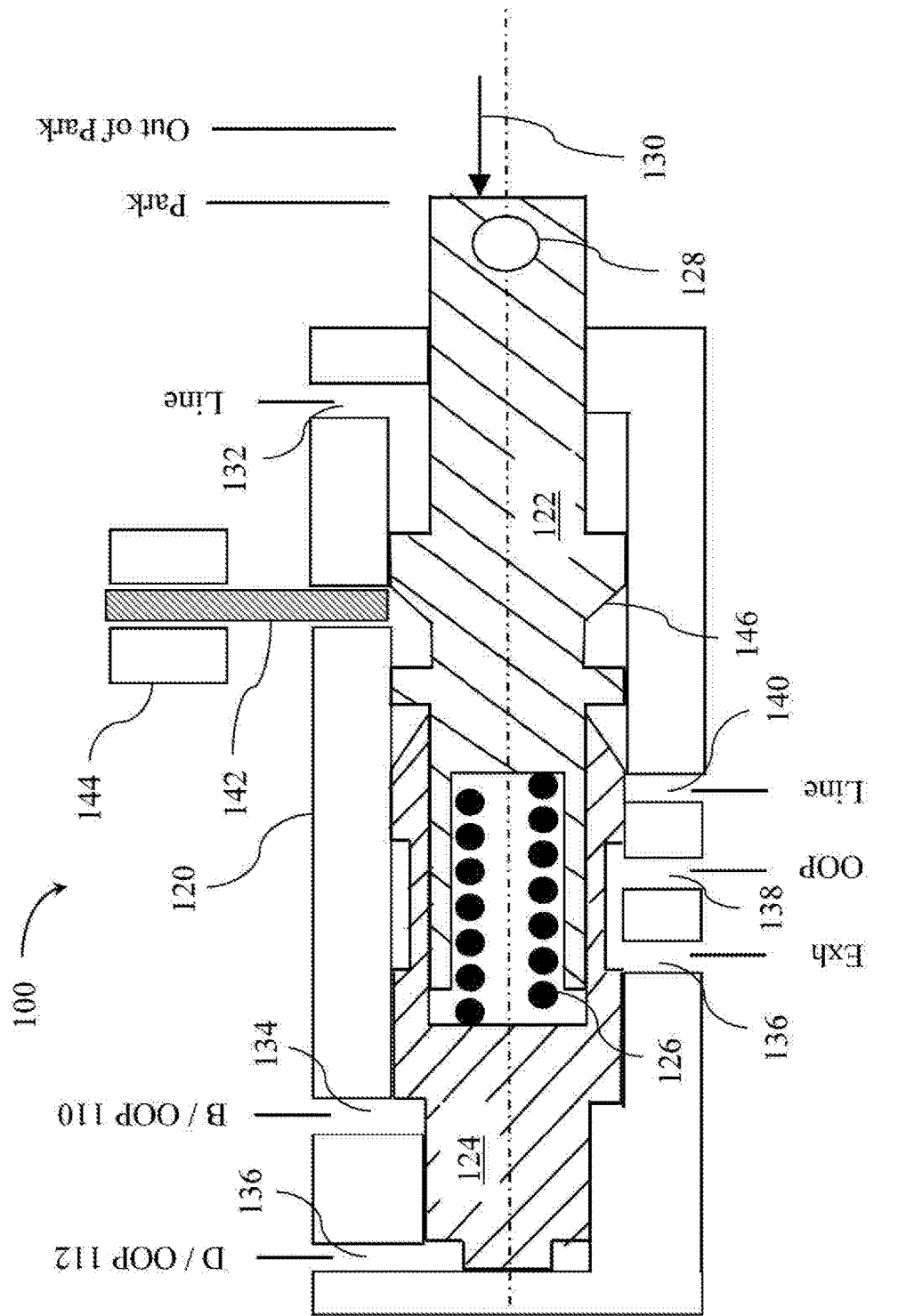
FIG. 7 illustrate a park valve assembly for the transmission of FIG. 1 in an intermediate position during the process of disengagement.

When the solenoid is de-energized with the engine running, line pressure relieves the friction force. Normally, this should be sufficient for a spring to retract pin 142. However, if pin 142 does not retract, it can be forced to retract by commanding an elevated line pressure with shift elements B and D released, as shown in FIG. 7. The elevated line pressure at port 132 moves spool 122 to the left, further compressing spring 126. The ramp 146 in spool 122 forces pin 142 to the retracted position. Note that elevating line pressure with shift elements B and D released is contrary to the commands that would normally be used to disengage the parking pawl. After the pin has been forced out of position, the parking pawl may be disengaged in the normal fashion by engaging shift elements B and D.

Figure 8:
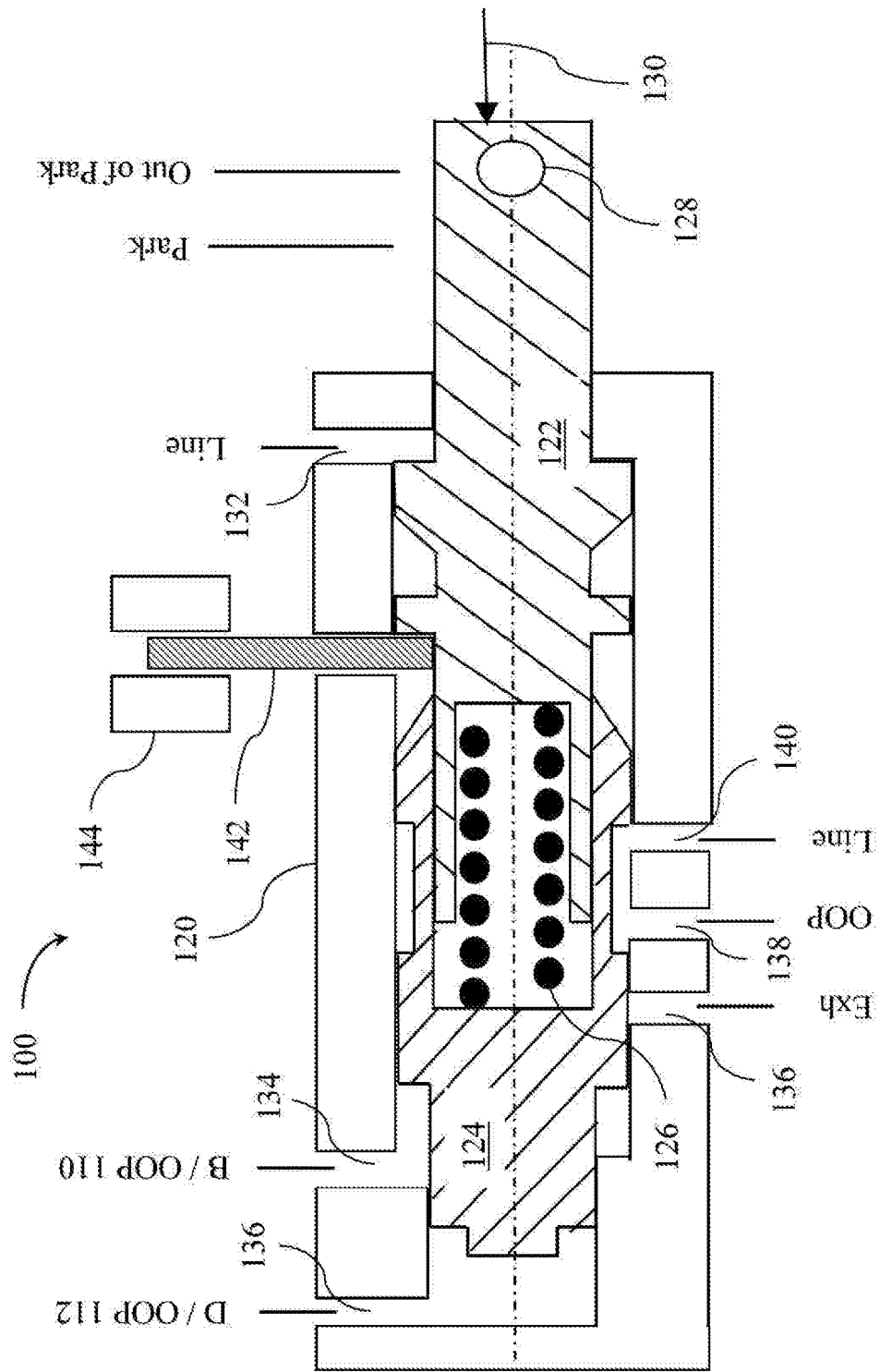
FIG. 8 illustrate a park valve assembly for the transmission of FIG. 1 in a position corresponding to park disengaged with the engine off.

Sometimes, there is a need to prevent parking pawl engagement with the engine off for an extended period. For example, it may be desirable to have the transmission in neutral with the engine off so that the vehicle can be towed flat behind a motorhome. FIG. 8 shows the park valve 100 in the configuration corresponding to Neutral with the engine shut off. Solenoid 144 is energized prior to engine shutdown, while the transmission in not in Park, to push pin 142 into engagement with lever interface spool 122. For short duration events, current may be maintained to solenoid 144 to hold the pin in position. However, that is not feasible for long duration events because it would deplete the battery. The park mechanism return spring force 130 pushes spool 122 into pin 142 such that friction between spool 122 and pin 142 holds pin 142 in position without requiring electrical energy. The configuration of FIG. 8 may also be used while the engine is running in which case, the solenoid would be de-energized as part of the transition into Park in response to movement of the shift selector.

Figure 9:
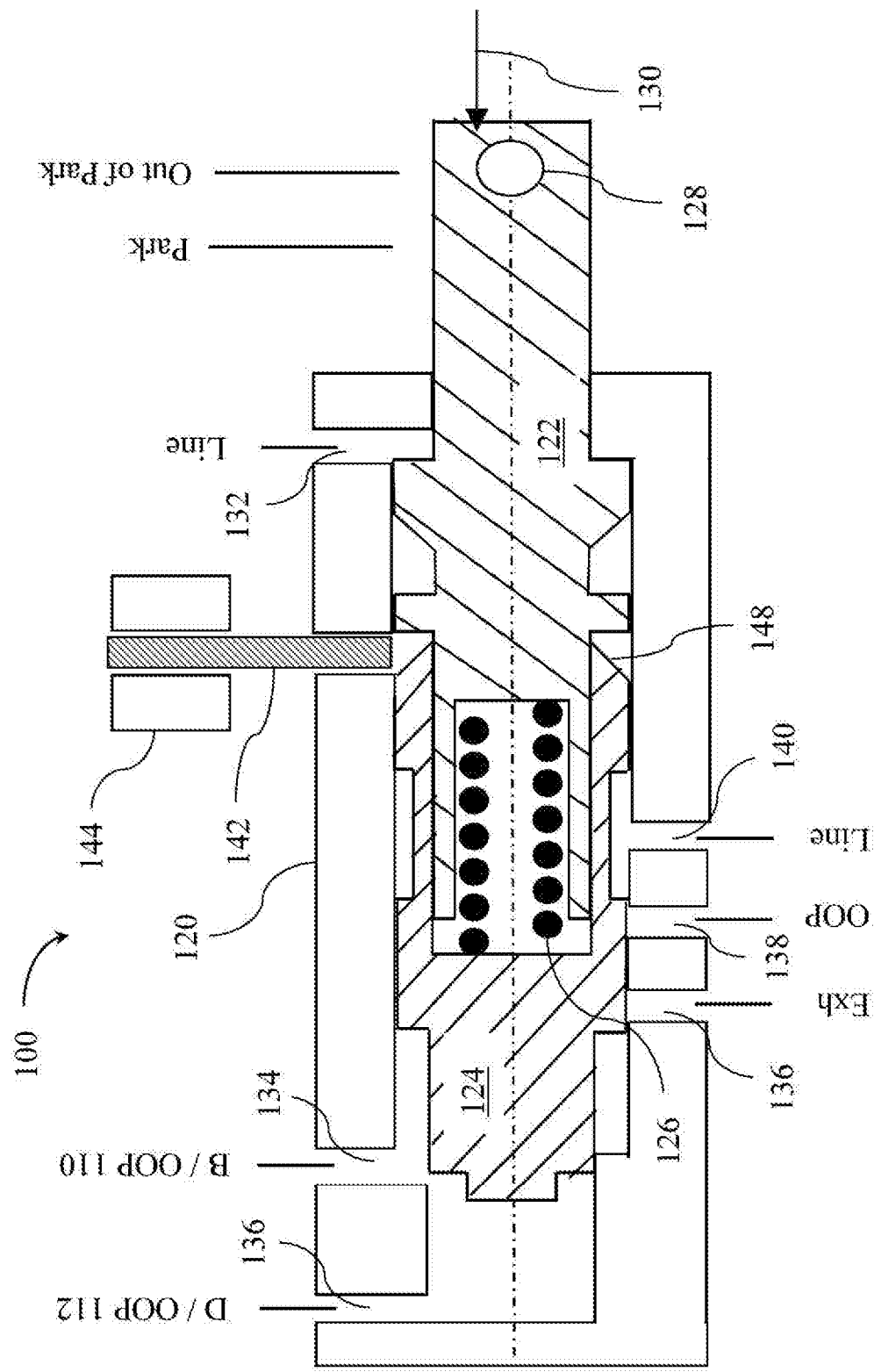
FIG. 9 illustrate a park valve assembly for the transmission of FIG. 1 in an intermediate position during the process of engagement.

After the engine is restarted, engaging shift elements B and D relieves the friction force. The controller may delay de-energizing the solenoid until Park is selected. Normally, this should be sufficient for a spring to retract pin 142. However, if pin 142 does not retract, it can be forced to retract by commanding an elevated line pressure with shift elements B and D engaged, as shown in FIG. 9. The elevated pressure at ports 134 and 136 moves spool 124 to the right, further compressing spring 126. The ramp 148 in spool 124 forces pin 142 to the retracted position. Note that elevating line pressure with shift elements B and D engaged is contrary to the commands that would normally be used to engage the parking pawl. After the pin has been forced out of position, the parking pawl may be engaged in the normal fashion by reducing line pressure.

Figure 10:
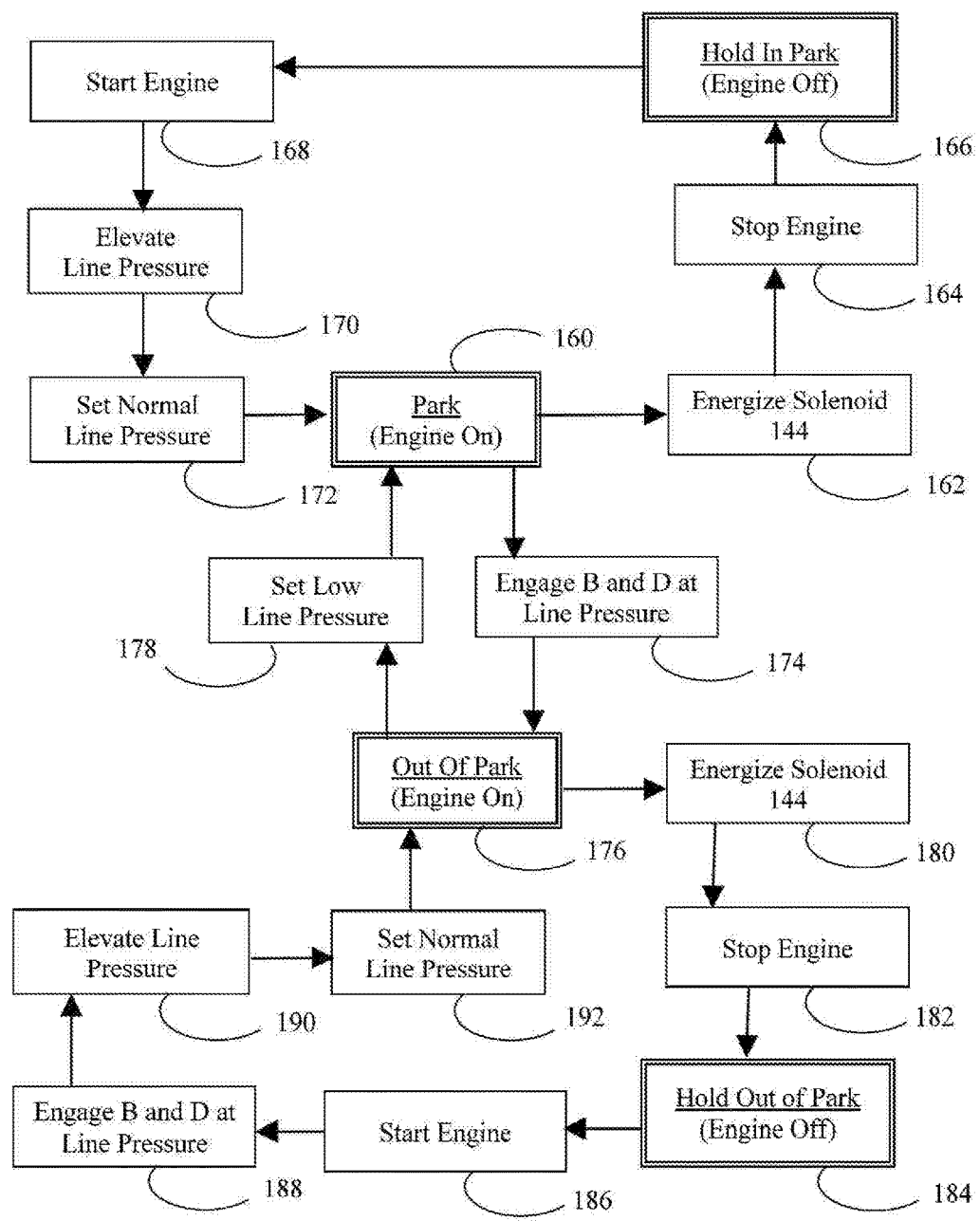
FIG. 10 is a flowchart for a process of manipulating the park state of a transmission having a park valve assembly as depicted in FIGS. 3-9.

FIG. 10 illustrates, in flowchart format, the steps to transition among various states. State 160 corresponds to FIG. 4 in which the park mechanism is engaged with the engine running. To transition to the state depicted in FIG. 6, the controller energizes the solenoid at 162 and stops the engine at 164 to transition into state 166. To transition back to state 160, the controller starts the engine at 168. Under normal conditions, the holding mechanism will release as soon as line pressure rises to a normal level. To ensure release of the holding mechanism, the line pressure may be briefly elevated at 170 to enter the condition depicted in FIG. 7 before being returned to the normal level at 172. In some embodiments, the controller may only elevate the line pressure if it detects that the holding mechanism has not released. In other embodiments, the controller may briefly elevate the line pressure as a precautionary measure.

To transition from Park state 160 to the out of park condition depicted in FIG. 5, the B and D shift elements are engaged at line pressure at 174. A threshold line pressure level is required to overcome the park mechanism return spring and transition into state 176. To return to Park state 160, the line pressure is dropped below the threshold level at 178. At least one of shift elements B and D must be released before the line pressure is raised in state 160 to avoid returning to out of park state 176.

To transition from state 176 to the state depicted in FIG. 8, the controller energizes the solenoid at 180 and stops the engine at 182 to transition into state 184. To transition back to state 176, the controller starts the engine at 186 and engages shift elements B and D at 188. Under normal conditions, the holding mechanism will release as soon as line pressure rises to a normal level. To ensure release of the holding mechanism, the line pressure may be briefly elevated at 190 to enter the condition depicted in FIG. 9 before being returned to the normal level at 192. In some embodiments, the controller may only elevate the line pressure if it detects that the holding mechanism has not released. In other embodiments, the controller may briefly elevate the line pressure as a precautionary measure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
 a first spool supported to slide within a valve housing between first and second positions, the first spool configured to disengage a park mechanism in the first position and to engage the park mechanism in the second position;
 a line pressure circuit configured to bias the first spool toward the second position;
 a second spool supported to slide within the valve housing between third and fourth positions, the second spool configured to fluidly connect an out-of-park hydraulic circuit to the line pressure circuit in the third position and to vent the out-of-park circuit in the fourth position;
 first and second hydraulic circuits configured to bias the second spool toward the third position;
 a compression spring configured to separate the first spool from the second spool, biasing the first spool toward the first position and biasing the second spool toward fourth position;

a pin configured to selectively engage the first spool to restrict motion of the first spool; and a solenoid configured to pull the pin away from the first spool.

2. The transmission of claim 1 further comprising:

third and fourth hydraulic circuits configured to engage first and second shift elements;

a first check valve configured to alternately fluidly connect the first hydraulic circuit to either the line pressure circuit or the third hydraulic circuit, whichever is at higher pressure; and a second check valve configured to alternately fluidly connect the second hydraulic circuit to either the line pressure circuit or the third hydraulic circuit, whichever is at higher pressure.

3. The transmission of claim 1 wherein the park mechanism biases the first spool toward the second position.

4. The transmission of claim 1 further comprising a controller programmed to while the first spool is held in the first position by the pin, start an engine;

while the first spool is still in the first position, elevate a line pressure to force the pin out of engagement with the first spool; and reduce the line pressure to move the first spool into the second position.

5. The transmission of claim 4 wherein the controller is further programmed to, after starting the engine and before elevating the line pressure, engage at least one shift element to bias the first spool toward the first position.

6. The transmission of claim 4 wherein the controller is further programmed to while the first spool is held in the second position by the pin, start the engine;

while the first spool is still in the second position, elevate the line pressure to force the pin out of engagement with the first spool; and engage at least one shift element to move the first spool into the second position.

7. The transmission of claim 6 wherein the at least one shift element consists of two shift elements.

8. A park valve comprising:

first and second spools supported to slide within a valve housing, the first spool adapted to mechanically engage and disengage a park mechanism;

a compression spring configured to separate the first spool from the second spool;

a pin configured to selectively engage the first spool to restrict motion of the first spool; and a solenoid configured to pull the pin away from the first spool.

9. The park valve of claim 8 wherein the valve housing defines a first port such that pressurized fluid supplied via the first port acts on a first area of the first spool biasing the first spool toward a position in which the park mechanism is engaged.

10. The park valve of claim 9 wherein the valve housing further defines second and third ports such that pressurized fluid supplied via the second and third ports acts on second and third areas of the second spool respectively biasing the second spool toward a position in which the park mechanism is disengaged, a sum of the second and third areas exceeding the first area.

11. The park valve of claim 9 wherein the valve housing further defines fourth, fifth, and sixth ports such that the park valve fluidly connects the fifth port alternately to the fourth port or to the sixth port based on a position of the second spool.

12. The park valve of claim 8 wherein the pin slides in a direction perpendicular to a sliding direction of the first spool.

* * * * *